Jan. 27, 1959
G. MARVIN
2,870,554
COMBINATION AGRICULTURAL IMPLEMENT
Filed March 25, 1954
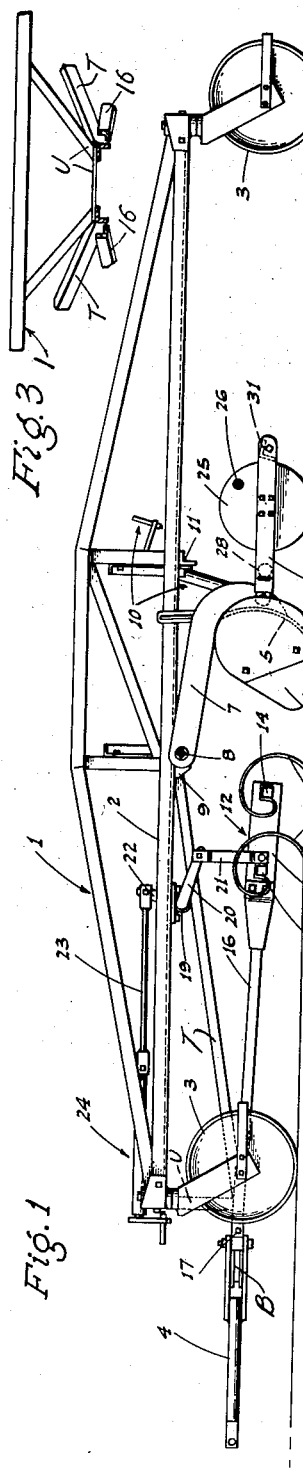
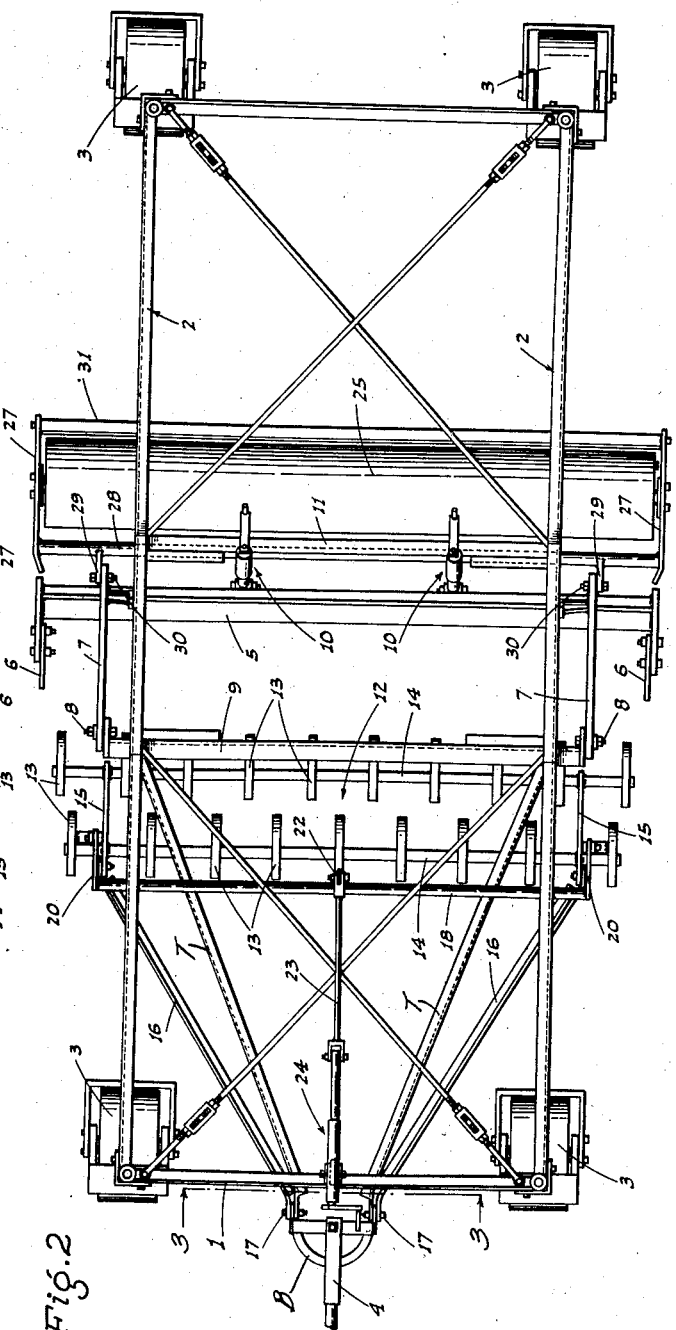
INVENTOR
George Marvin
BY Webster & Webster
ATTORNEYS

United States Patent Office 2,870,554
Patented Jan. 27, 1959

2,870,554

COMBINATION AGRICULTURAL IMPLEMENT

George Marvin, Woodland, Calif., assignor to Marvin Landplane Company, Woodland, Calif., a partnership Application March 25, 1954, Serial No. 418,687

1 Claim. (Cl. 37—153)

This invention relates to agricultural implements, and particularly to that form of implement used for finish leveling of flat areas and widely known under the trademark "Landplane."

Such implements comprise an elongated frame, wheel-supported at its ends, and ordinarily are provided only with a transverse leveler blade intermediate the ends of the frame.

The major object of the present invention is to increase the usefulness of implements of this type by providing the same with attachments whereby, in addition to the leveling operation, the ground may be loosened or harrowed before it is leveled and compacted after it has been leveled; all in one continuous operation or pass of the implement over the area being worked on.

Also, the attachments can be arranged, if desired, so that the ground may be reharrowed rather than being rolled after it has been leveled, in order to prevent wind erosion, or for the purpose of enhancing penetration of moisture.

Still another object of the invention is to provide a combination agricultural implement which is practical, reliable, and durable, and one which is exceedingly effective for the purpose for which it is designed.

These objects are accomplished by means of such structure and relative arrangement of parts as will fully appear by a perusal of the following specification and claim.

In the drawings:

Fig. 1 is a side elevation of the implement, as provided with ground harrowing and rolling or compacting attachments in addition to the conventional leveling blade.

Fig. 2 is a top plan view of such implement.

Fig. 3 is a fragmentary transverse section on line 3—3 of Fig. 2.

Referring now more particularly to the characters of reference on the drawings, the implement comprises an elongated frame 1 of rectangular form in plan and which includes side beams 2; the frame being supported, at its corners, by wide-faced caster wheels 3.

At its forward end, the frame is, as usual, provided with a swivel tongue 4 adapted for draft connection to a tractor.

A transverse leveling blade 5, equipped with side wings 6, is disposed under the frame substantially between the end wheels; said blade being rigid with arms 7 which extend forwardly over the blade from a rigid connection with the back of the blade.

These arms 7, at their forward end, are pivotally supported, as at 8, from a cross beam 9 mounted on beams 2.

The blade may be adjusted up and down as may be desired by hand-operated screw units 10 connected between the back of the blade and a cross bar 11 extending between the frames 2.

A harrow unit 12 is supported from the frame 1 ahead of the blade; said unit comprising rows of conventional spring teeth 13 mounted on transverse tool bars 14 which are carried on side arms 15.

These side arms are rigid with substantially horizontal tension bars 16 which converge fowadly and are pivoted, at their forward end, on frame 1 adjacent the connection of the draft tongue 4 therewith, as shown at 17. As will be seen from Fig. 2, the tongue 4 is pivoted for horizontal swinging movement on bracket B, which in turn is pivoted for vertical swinging movement—along with the tongue—on pivots 17. These pivots are supported in the forward ends of tension braces T which diverge from the bracket in a rearward direction and with an upward slope, as shown in Fig. 1, to rigid connection with the side beams 2 of frame 1. In addition the braces T are rigidly connected to and supported adjacent their forward end from the top front cross beam of the frame 1 by a depending laterally diagonal brace and cross bar unit U, as shown in Fig. 3. The braces T and unit U thus actually form a part of the main frame of the implement. As will be apparent, the frame is of sufficient width, and the bars 16 and braces T—which are below the side beams 2 of the frame 1, and from which the front caster wheels are supported—are so arranged that said caster wheels may freely swing without interfering with said bars and braces.

A transverse shaft 18 is journaled on bearing brackets 19 detachably mounted on the under side of beams 2. At its ends, radial arms 20 project from the shaft and are connected by depending links 21 to arms 15 so that upon rotation of the shaft, the harrow unit will be raised or lowered, swinging about pivots 17 as an axis.

Due to the length of bars 16 and the consequent relatively great distance of pivots 17 from the spring teeth, the alinement of the harrow unit—relative to a horizontal plane and hence its harrowing effectiveness—is not greatly affected by any vertical adjustment thereof.

Rotation of the shaft 18 is effected by means of an upstanding arm 22 on said shaft, which arm is detachably connected by a link 23 to a longitudinally extending manually operated contractible and extensible control unit 24 mounted on frame 1 at the front and of the same general construction as that used for the control of the blade 5, as previously recited.

Since the adjusting means for the blade is independent of that for the harrow unit, the working depth of the two devices may be separately controlled, while for transportation both the blade and said unit may be raised sufficiently to clear the ground.

Disposed close to but rearwardly of the blade 5 is a transverse roller 25. This roller is hollow and forms an enclosed chamber into which water may be poured to increase the weight; the roller being provided with a removable end plug 26 to enable such water to be fed to or drained from the roller chamber.

The roller is rotatably supported in a frame structure which includes side arms 27 connected at their forward end by a cross member 28 which is pivotally connected by short arms 29 thereon to the arms 7 at their rear end, behind blade 5, by removable pivots 30, as clearly shown in Fig. 2. Rearwardly of the roller, arms 27 are connected by a cross bar 31.

The roller 25 normally floats and rides on the ground of its own weight irrespective of the vertical working position of the blade.

The roller 25 may be detached from the implement when desired merely by removing the pivot bolts 30.

If a ground reharrowing rather than a rolling action is desired rearwardly of the blade, the roller 25 is detached, as above, and a harrow unit, corresponding generally to the one indicated at 12, is substituted for such roller, likewise being detachably connected to the rear ends of the arm 7 by suitable pivot bolts. In this case a control and adjusting means (such as is used in connection with the harrow unit 12) is connected between the frame 1 and the harrow unit which trails the blade.

By means of the above described implement and selective arrangement of the ground working attachments thereon, the ground may be leveled; leveled and rolled; harrowed, leveled, and rolled; harrowed, leveled, and reharrowed; or leveled and harrowed, as working conditions may require.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

An agricultural implement comprising an elongated rectangular frame including an upper portion having side members, caster wheels supporting the upper frame portion adjacent the corners thereof, a transverse tool bar under said members intermediate their ends, a draft tongue projecting forwardly from and below the frame portion centrally of the width thereof, a supporting bracket on which the tongue is pivoted for horizontal swinging movement, tension braces included with the frame and extending rearwardly from the sides of the bracket in diverging relation to each other and with an upward slope to rigid connection with the side members of the upper frame portion, tension bars extending rearwardly from the forward end of the tension braces in overlapping relation thereto and diverging rearwardly thence to rigid connection with the tool bar adjacent the ends thereof, and transverse pivot means connecting the bracket and the related tension bars and braces together; there being means operatively connected to said tension bars to raise and lower the same.

References Cited in the file of this patent

UNITED STATES PATENTS

| | | |
|---|---|---|
| 748,737 | Hubbell | Jan. 5, 1904 |
| 816,085 | Foote | Mar. 27, 1906 |
| 869,481 | Daniel | Oct. 29, 1907 |
| 1,158,805 | Haynes | Nov. 2, 1915 |
| 1,250,853 | Goodro | Dec. 18, 1917 |
| 1,324,187 | White | Dec. 9, 1919 |
| 1,428,319 | Brannan | Sept. 5, 1922 |
| 1,431,594 | Oswald | Oct. 10, 1922 |
| 1,437,654 | Hast | Dec. 5, 1922 |
| 1,706,257 | Ronning et al. | Mar. 19, 1929 |
| 1,786,240 | Hightower | Dec. 23, 1930 |
| 1,894,871 | Iversen | Jan. 17, 1933 |
| 2,124,625 | Marvin | July 26, 1938 |
| 2,662,314 | Lindeman et al. | Dec. 15, 1953 |